United States Patent
Hu et al.

(10) Patent No.: US 11,803,585 B2
(45) Date of Patent: Oct. 31, 2023

(54) METHOD AND APPARATUS FOR SEARCHING FOR AN IMAGE AND RELATED STORAGE MEDIUM

(71) Applicant: BOE TECHNOLOGY GROUP CO., LTD., Beijing (CN)

(72) Inventors: Fengshuo Hu, Beijing (CN); Honghong Jia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 105 days.

(21) Appl. No.: 16/975,631

(22) PCT Filed: Sep. 27, 2019

(86) PCT No.: PCT/CN2019/108631
§ 371 (c)(1),
(2) Date: Aug. 25, 2020

(87) PCT Pub. No.: WO2021/056440
PCT Pub. Date: Apr. 1, 2021

(65) Prior Publication Data
US 2021/0097101 A1    Apr. 1, 2021

(51) Int. Cl.
*G06F 16/583* (2019.01)
*G06F 16/532* (2019.01)
(Continued)

(52) U.S. Cl.
CPC ........ *G06F 16/5854* (2019.01); *G06F 16/532* (2019.01); *G06V 10/255* (2022.01); *G06V 40/103* (2022.01)

(58) Field of Classification Search
CPC .. G06F 16/532; G06F 16/5854; G06F 16/583; G06K 9/00369; G06K 9/3241; G06V 10/255; G06V 40/103
See application file for complete search history.

(56) References Cited

U.S. PATENT DOCUMENTS

| 2011/0110594 A1* | 5/2011 | Hasegawa | G06F 16/583 382/190 |
| 2013/0028517 A1* | 1/2013 | Yoo | G06V 40/107 382/173 |

(Continued)

FOREIGN PATENT DOCUMENTS

| CN | 102982165 A | 3/2013 |
| CN | 107506717 A | 12/2017 |

(Continued)

OTHER PUBLICATIONS

PCT International Search Report, Application No. PCT/CN2019/108631, dated Mar. 27, 2020, 8 pages: with English translation.
(Continued)

*Primary Examiner* — Richard L Bowen
*Assistant Examiner* — Aryan D Toughiry
(74) *Attorney, Agent, or Firm* — Armstrong Teasdale LLP

(57) ABSTRACT

Embodiments of the present disclosure provide a method and an apparatus for searching for an image and a related storage medium. The method includes obtaining reference keypoint data of a reference person in a reference image, and searching, based on the reference keypoint data, a set of candidate images for at least one target image containing at least one candidate person that has a pose similar to the reference person.

9 Claims, 5 Drawing Sheets

(51) Int. Cl.
*G06V 10/20* (2022.01)
*G06V 40/10* (2022.01)

(56) References Cited

U.S. PATENT DOCUMENTS

| | | | |
|---|---|---|---|
| 2015/0078628 A1* | 3/2015 | Anderson | G06T 11/00 |
| | | | 382/218 |
| 2019/0147226 A1 | 5/2019 | Yip et al. | |
| 2019/0172223 A1* | 6/2019 | Vajda | G06V 40/103 |
| 2019/0176820 A1* | 6/2019 | Pindeus | B60W 30/09 |

FOREIGN PATENT DOCUMENTS

| | | |
|---|---|---|
| CN | 108537136 A | 9/2018 |
| CN | 109947975 A | 6/2019 |

OTHER PUBLICATIONS

PCT Written Opinion, Application No. PCT/CN2019/108631, dated Mar. 27, 2020, 6 pages.: with English translation of relevant part.
Hao-Shu Fang et al., "RMPE: Regional Multi-Person Pose Estimation", 10 pages.

* cited by examiner

+

=

METHOD AND APPARATUS FOR SEARCHING FOR AN IMAGE AND RELATED STORAGE MEDIUM

CROSS REFERENCE TO RELATED APPLICATIONS

This patent application is a National Stage Entry of PCT/CN2019/108631 filed on Sep. 27, 2019, the disclosure of which is incorporated by reference herein in its entirety as part of the present application.

BACKGROUND

The present disclosure relates to image recognition technology, and particularly to a method and an apparatus for searching for an image and the related storage medium.

Generally, image search is performed based on an image tag (i.e., semantic information for describing an image content) or an image content. As the accuracy and speed of image recognition increase, the image search can also be performed based on a feature point of an image.

Bulk data processing and a high-performance processor can enhance stability and reliability of a deep learning method, which causes a keypoint detection technology to be developed significantly. Currently the keypoint detection technology is widely used in the field of computer vision. By recognizing different keypoints, a pose recognition, such as a body pose recognition, a facial expression recognition, or a finger motion recognition, can be realized.

BRIEF DESCRIPTION

Embodiments of the present disclosure provide a method and an apparatus for searching for an image and a related storage medium.

A first aspect of the present disclosure provides a method for searching for an image. The method includes obtaining reference keypoint data of a reference person in a reference image, and searching, based on the reference keypoint data, a set of candidate images for at least one target image containing at least one candidate person that has a pose similar to the reference person.

In an embodiment of the present disclosure, searching for at least one target image containing at least one candidate person that has the pose similar to the reference person in the set of candidate images may include obtaining candidate keypoint data of one or more candidate persons in at least one candidate image of the set of candidate images, determining, for at least one of the one or more candidate persons, whether the candidate person has the pose similar to the reference person based on the reference keypoint data and the candidate keypoint data, and determining, in response to the candidate person having the pose similar to the reference person, the corresponding candidate image as the target image.

In an embodiment of the present disclosure, obtaining the candidate keypoint data of one or more candidate persons in at least one candidate image of the set of candidate images may include querying the candidate keypoint data of the at least one candidate image from a keypoint database. In the embodiment, the keypoint database stores a correspondence between an identification of a candidate image, an identification of a candidate person, and candidate keypoint data of the candidate person.

In an embodiment of the present disclosure, the candidate keypoint data of the candidate person in the keypoint database may be obtained using a first pose recognition model. In the embodiment, the first pose recognition model may be trained based on a first sample image set.

In an embodiment of the present disclosure, obtaining the candidate keypoint data of one or more candidate persons in at least one candidate image of the set of candidate images may include obtaining the candidate keypoint data of the at least one candidate image using a first pose recognition model. In the embodiment, the first pose recognition model may be trained based on a first sample image set.

In an embodiment of the present disclosure, determining whether the candidate person has the pose similar to the reference person may include calculating a pose similarity between the candidate person and the reference person based on the reference keypoint data and the candidate keypoint data, determining, in response to the pose similarity being greater than a predetermined threshold, that the candidate person has the pose similar to the reference person.

In an embodiment of the present disclosure, calculating the pose similarity between the candidate person and the reference person may include calculating a pose distance L between the candidate person and the reference person according to the following equations:

$$d_k = \sqrt{(x_k - x_{0k})^2 + (y_k - y_{0k})^2}$$

$$l_k = \frac{1}{1 + e^{\left(5 + \frac{h}{2} - \frac{d_k}{h}\right)}} + \frac{1}{2}$$

$$L = \sum_{k=0}^{K-1} l_k$$

where K represents a number of the keypoints of the candidate person, $x_k$ and $y_k$ represent coordinates of keypoint k of the candidate person in the candidate image, where $0 \leq k \leq K-1$, $x_{0k}$ and $y_{0k}$ represent coordinates of keypoint k of the reference person in the reference image, h represents a head length of the reference person, $d_k$ represents a distance between keypoint k of the candidate person and keypoint k of the reference person, and $l_k$ represents a sub-pose distance between keypoint k of the candidate person and keypoint k of the reference person, and calculating the pose similarity based on the pose distance, wherein the shorter the pose distance is, the greater the pose similarity is.

In an embodiment of the present disclosure, the reference keypoint data may be obtained using a second pose recognition model. The second pose recognition model may be trained based on a second sample image set.

In an embodiment of the present disclosure, the first sample image set may be obtained by performing style transfer on a part or all of the images in the second sample image set.

In an embodiment of the present disclosure, the reference keypoint data and the candidate keypoint data may be obtained based on the same human coordinate system.

In an embodiment of the present disclosure, the human coordinate system may be a torso triangle coordinate system, wherein an origin of the torso triangle coordinate system may be a midpoint of a connecting line between a keypoint indicating a right waist and a keypoint indicating a left waist, a horizontal axis may be in a direction of the connecting line between the keypoint indicating the right waist and the keypoint indicating the left waist, and a vertical axis may pass through a midpoint of a connecting line between a keypoint indicating a left shoulder and a keypoint indicating a right shoulder and be perpendicular to the horizontal axis.

In an embodiment of the present disclosure, the method may further include providing at least one target image.

In an embodiment of the present disclosure, the method may further include replacing the at least one candidate person in the at least one target image with the reference person to generate a new image, and providing the new image.

A second aspect of the present disclosure provides an apparatus for searching for an image. The apparatus includes one or more processors, and a memory coupled to the one or more processors and has computer program instructions stored therein. The computer program instructions are configured to, when executed by the processor, cause the apparatus to perform the method according to the first aspect of the present disclosure.

A third aspect of the present disclosure provides a computer-readable storage medium having computer program instructions stored thereon, wherein the computer program instructions are configured to, when executed by a computer, cause the computer to perform the method according to the first aspect of the present disclosure.

BRIEF DESCRIPTION OF THE DRAWINGS

In order to illustrate the technical solutions of the embodiments of the present disclosure more clearly, drawings of the embodiments will be briefly described below. It should be appreciated that the drawings described below only relate to some embodiments of the present disclosure, rather than limiting the present disclosure, wherein throughout each of these drawings the same reference numerals indicate the same parts or features.

DETAILED DESCRIPTION

Figure 1:
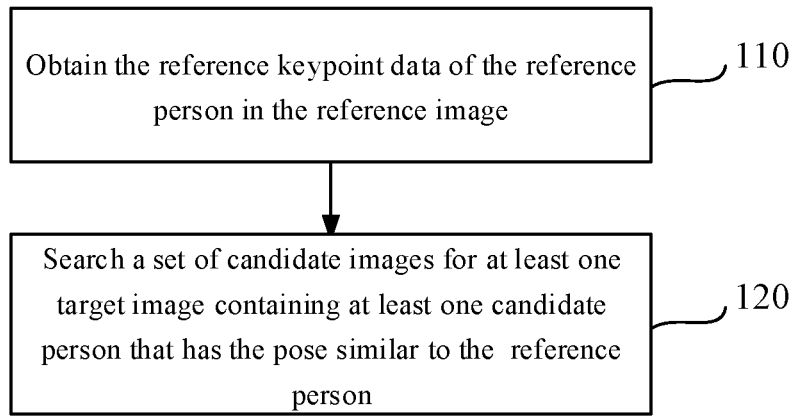
FIG. 1 shows a schematic flowchart of a method for searching for an image according to an embodiment of the present disclosure.

In order to make the technical solutions and advantages of embodiments of the present disclosure more clear, the technical solutions in the embodiments of the present disclosure will be clearly and completely described below in detail in conjunction with the drawings. Obviously, the described embodiments described are merely some but not all of embodiments of the present disclosure. Based on the described embodiments of the present disclosure, all other embodiments obtained by those skilled in the art without creative work also fall within the protecting scope of the present disclosure.

The terms "a(an)", "one", "this", and "the" are intended to mean the presence of one or more elements when referring to the elements and their embodiments of the present disclosure. The terms "comprising", "comprising", "include", "including", "contain", "containing", "have", and "having", etc. are intended to be inclusive and to indicate that there may be additional elements other than the listed elements. The flow charts depicted in the present disclosure is merely an example. There may be many variations of the flowchart or the steps described therein without departing from the spirit of the disclosure. For example, the steps may be performed in a different order, or steps may be added, deleted, or modified. These variations shall be considered to be a part of what desired to claim.

Unless otherwise defined, all terms (including technical and scientific terms) used herein have the same meaning as commonly understood by those skilled in the art to which the subject matter of the present disclosure belongs. It will be further understood that terms, such as those defined in commonly used dictionaries, should be interpreted as having the meaning that are consistent with their meanings in the context of the specification and the related art and will not be interpreted in an idealized or overly formal sense unless expressly so defined herein. As employed herein, the description of "connecting" or "coupling" two or more parts together should refer to the parts being directly combined together or being combined via one or more intermediate components.

As described above, the image search may be performed based on the feature points of the image, for example, the color, shape, and texture of an object (e.g., a physical object, a person, etc.) in the image. However, the image search does not take the pose of the person in the image into consideration.

In order to solve the technical problem above, the embodiments of the present disclosure propose the method for searching for the image. In this method, reference keypoint data of the reference person in the reference image is obtained, and based on the obtained reference keypoint data, the target image containing the candidate person that has the pose similar to the reference person is searched for.

The method for searching for the image according to some embodiments of the present disclosure will be described in detail with reference to FIGS. 1 to 7.

FIG. 1 shows a schematic flowchart of the method for searching for the image according to an embodiment of the present disclosure.

Figure 2:
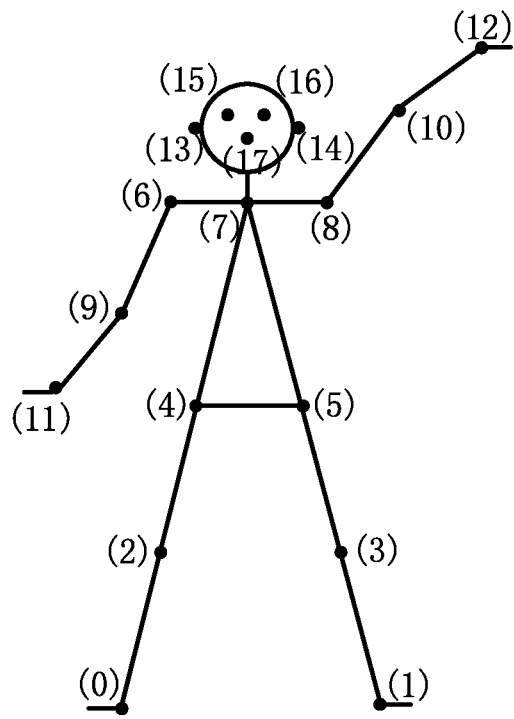
FIG. 2 shows a schematic diagram illustrating the keypoints according to an embodiment of the present disclosure.

As shown in FIG. 1, at block 110, the reference keypoint data of the reference person in the reference image is obtained. In some embodiments of the present disclosure, there may be eighteen keypoints to be set, denoted as keypoint 0 to keypoint 17, respectively. FIG. 2 shows the keypoints according to an embodiment of the present disclosure. As shown in FIG. 2, the keypoints may include a right ankle point (0), a left ankle point (1), a right knee point (2), a left knee point (3), a right waist point (4), a left waist point (5), a right shoulder point (6), a midpoint (7) of a left shoulder point and the right shoulder point, the left shoulder point (8), a right elbow point (9), a left elbow point (10), a right wrist point (11), a left wrist point (12), a right ear point (13), a left ear point (14), a right eye point (15), a left eye point (16), and a nose point (17). In some other embodiments of the present disclosure, there may be other number (for example, 14 or 28) of the keypoints to be set.

Figure 3:
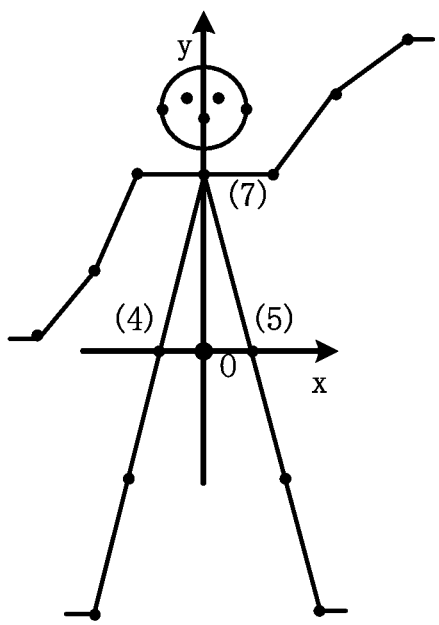
FIG. 3 shows a schematic diagram illustrating the torso triangle coordinate system according to an embodiment of the present disclosure.

In an embodiment of the present disclosure, the keypoint data may include coordinate values of a part or all of the eighteen keypoints. In the embodiments of the present disclosure, in order to normalize the data and facilitate subsequent processing, the keypoint data of different persons may be based on the same human coordinate system, so that the keypoint data can be normalized in such a way that at least two identical keypoints of different persons have the same coordinate values respectively. In the embodiments of the present disclosure, the human coordinate system may be the torso triangle coordinate system. FIG. 3 shows the torso triangle coordinate system according to an embodiment of the present disclosure. As shown in FIG. 3, the torso triangle includes the midpoint (7) of the connecting line between the left shoulder point and the right shoulder point, the right waist point (4), and the left waist point (5). The origin O of the torso triangle coordinate system is the midpoint of the connecting line between the right waist point (4) and the left waist point (5), the horizontal axis x is in a direction of the connecting line between the right waist point (4) and the left waist point (5), and the vertical axis y passes through the midpoint (7) of the connecting line between the left shoulder point and the right shoulder point and the origin O and is perpendicular to the horizontal axis x. The keypoint data of different persons based on the torso triangle coordinate system as shown in FIG. 3 can be normalized in such a way that the respective torso triangles may have the same coordinate values. FIG. 3 only shows an example of the torso triangle coordinate system. In other embodiments of the present disclosure, other forms of torso triangular coordinate systems may be constructed.

In an embodiment of the present disclosure, the reference keypoint data may be obtained using the second pose recognition model. Specifically, the reference image may be provided. In the embodiment, the reference image may be a photograph. Any person in the reference image may be considered as the reference person. Then, the image may be processed with the second pose recognition model to obtain the reference keypoint data of the reference person.

In an embodiment of the present disclosure, the second pose recognition model may be trained based on the second sample image set. The second sample image set may include a plurality of images, for example, photographs, containing one or more persons. Each person in this image may be marked with the keypoints. The second pose recognition model may be obtained by performing deep learning based pose recognition on the second sample image set.

In the embodiments of the present disclosure, the reference image and the images in the second sample image set may be of the same type, such as a photograph, a painting, and the like. Therefore, the second pose recognition model may be used to obtain the reference keypoint data of the reference person in the reference image, thereby recognizing the pose of the reference person. In some embodiments of the present disclosure, the second pose recognition model may be based on a top-bottom method. In the top-bottom method, a person may be determined first, and then the keypoint data belonging to the person may be obtained. With the top-bottom method, the accuracy of obtaining the reference keypoint data can be increased. In other embodiments of the present disclosure, the second pose recognition model may be based on a bottom-top method. On the contrary to the top-bottom method, in the bottom-top method, the keypoint data may be determined first, and then the person to which the keypoint data belongs may be determined. With the bottom-top method, the speed of obtaining the reference keypoint data can be increased.

At block 120, based on the obtained reference keypoint data, a set of candidate images is searched for at least one target image containing at least one candidate person that has the pose similar to the reference person. In the embodiment of the present disclosure, the set of candidate images may include one or more candidate images containing person(s). The candidate image may be, for example, a painting. In the searching, the candidate person that has the pose similar to the reference person may be searched for in the one or more candidate images, and the candidate image with the candidate person that has the similar pose may be determined as the target image. In the embodiment of the present disclosure, one or more candidate persons that have the similar pose may be found, and the one or more candidate persons that have the similar pose may be contained in the one or more candidate images.

Figure 4:
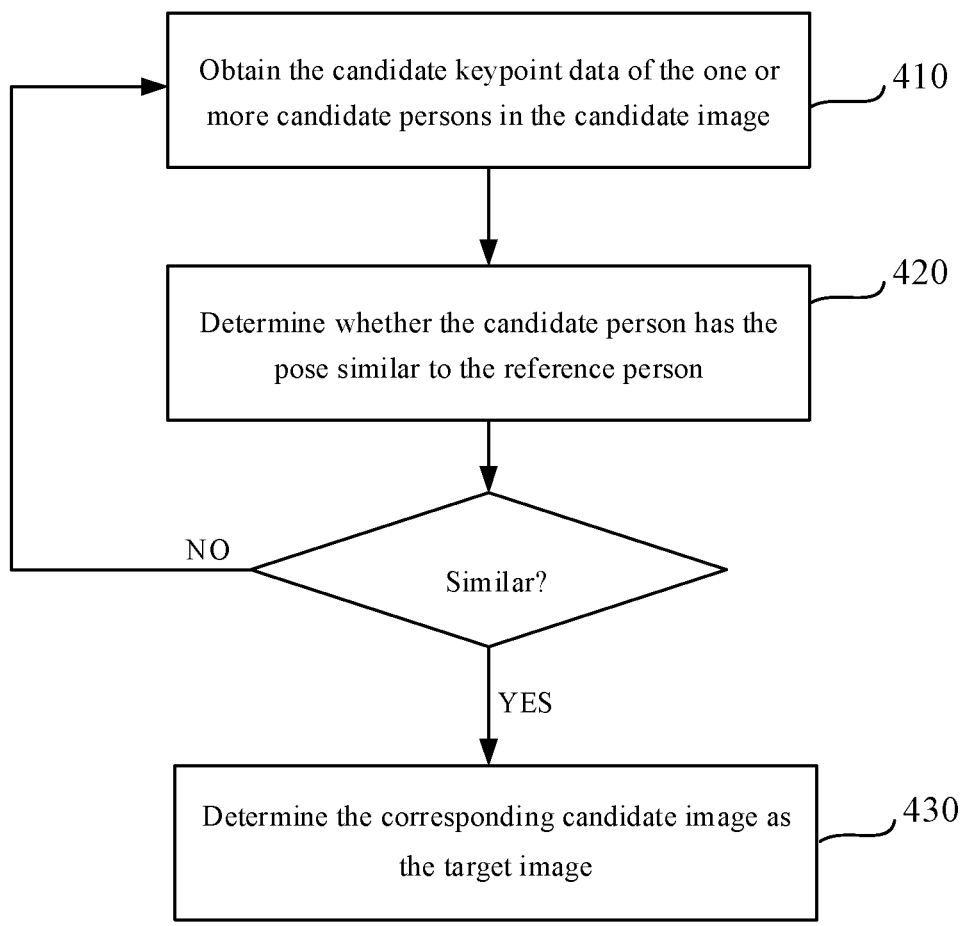
FIG. 4 shows a schematic flowchart of a process for searching for the target image according to an embodiment of the present disclosure.

The process of searching for the target image in the candidate image set will be described in detail below with reference to FIG. 4. As shown in FIG. 4, at block 410, the candidate keypoint data of the one or more candidate persons in the at least one candidate image of the set of candidate images is obtained.

In some embodiments of the present disclosure, a keypoint database may be queried for the candidate keypoint data of the one or more candidate persons in the candidate image based on an identification of the candidate image. In the embodiment, the identification of the candidate image may be for example an image name, a uniquely assigned image identifier, and so on, and may be used to identify the candidate image. A correspondence between the identification of the candidate image, the identification of the candidate person and the candidate keypoint data of the candidate person may be stored in the keypoint database, for example, in the form of painting 1—candidate person 1—keypoint 0 $(x_0, y_0), \ldots,$ keypoint 17 $(x_{17}, y_{17})$. The keypoint database may be established using the first pose recognition model in advance. In the embodiment of the present disclosure, the first pose recognition model may be used to process the candidate images in the set of candidate images, thereby obtaining the candidate keypoint data of each candidate person in the candidate images. Similar to the second pose recognition model, the first pose recognition model may be trained based on the first sample image set. Specifically, the first pose recognition model may be trained by performing deep learning based pose recognition on the first sample image set. The first sample image set includes a plurality of images, such as paintings and photographs, containing one or more persons. Each person in the images is also marked with the keypoints. In the embodiment of the present disclosure, the candidate images and the images in the first sample image set may be of the same type. Therefore, the first pose recognition model may be used to obtain the candidate keypoint data of the candidate person in the candidate images, thereby recognizing the pose of candidate person. The first pose recognition model may also obtain the keypoint data based on the top-bottom or bottom-top method. In the embodiments of the present disclosure, the first sample image set may be obtained by performing style transfer on a part or all of the images in the second sample image set. Such the style transfer can solve the problem of the small image data in the first sample image set, so that it is relatively easy to train a pose recognition model dedicated to a specific type of images (e.g., paintings).

In other embodiments of the present disclosure, instead of establishing the keypoint database in advance, the first pose recognition model may be used directly to obtain the candidate keypoint data of one or more candidate persons in the candidate images.

At block 420, for at least one of the one or more candidate persons in the candidate image, it is determined whether the candidate person has the pose similar to the reference person based on the reference keypoint data and the candidate keypoint data of the candidate person. Whether the candidate person has the pose similar to the reference person will be described below with reference to FIG. 5.

Figure 5:
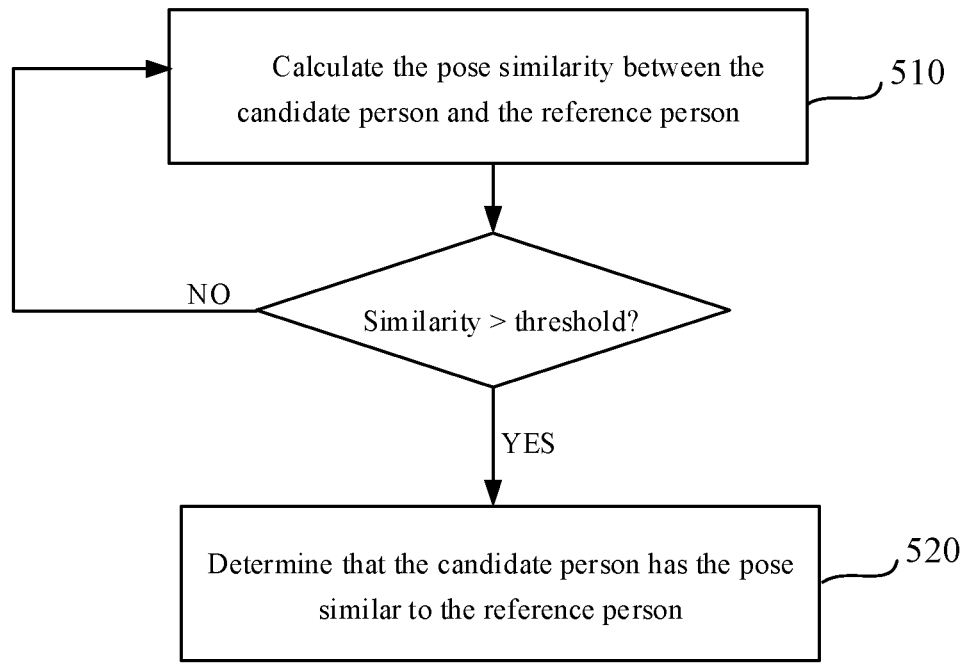
FIG. 5 shows a schematic flowchart of a process for determining whether the candidate person has the pose similar to the reference person according to an embodiment of the present disclosure.

FIG. 5 shows a schematic flowchart of a process for determining whether the candidate person has the pose similar to the reference person according to an embodiment of the present disclosure. As shown in FIG. 5, at block 510, the pose similarity between the candidate person and the reference person is calculated based on the previously obtained reference keypoint data and the candidate keypoint data of the candidate person. The process of calculating the pose similarity will be described below with reference to FIG. 6.

Figure 6:
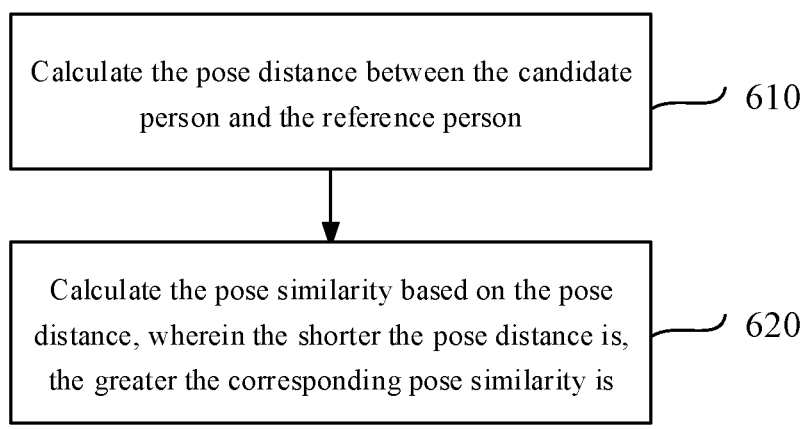
FIG. 6 shows a schematic flowchart of a process for calculating the pose similarity according to an embodiment of the present disclosure.

FIG. 6 shows a schematic flowchart of a process for calculating the pose similarity between the candidate person and the reference person according to an embodiment of the present disclosure. As shown in FIG. 6, at block 610, based on the reference keypoint data of the reference person and the candidate keypoint data of the candidate person, the pose distance L between the candidate person and the reference person is calculated according to Equation (1):

$$L = \sum_{k=0}^{K-1} l_k,$$  Equation (1)

where K represents the number of the keypoints (e.g., K=18), and $l_k$ represents the sub-pose distance between keypoint k of the candidate person and keypoint k of the reference person, which may be calculated according to Equation (2):

$$l_k = \frac{1}{1 + e^{\left(5 + \frac{h}{2} - \frac{d_k}{h}\right)}} + \frac{1}{2},$$  Equation (2)

where h represents the head length of the reference person, and $d_k$ represents the distance between keypoint k of the candidate person and keypoint k of the reference person, and $d_k$ may be calculated according to Equation (3):

$$d_k = \sqrt{(x_k - x_{0k})^2 + (y_k - y_{0k})^2}$$  Equation (3)

where $x_k$ and $y_k$ represent the coordinates of keypoint k of the candidate person in the candidate image, and $x_{0k}$ and $y_{0k}$ represent the coordinates of keypoint k of the reference person in the reference image. At block 620, the pose similarity is calculated based on the calculated pose distance, so that the shorter the pose distance is, the greater the corresponding pose similarity is. In the embodiment of the present disclosure, the pose similarity may be defined as an inverse proportional function of the pose distance.

Referring back to FIG. 5, it is determined whether the pose similarity is greater than the predetermined threshold. If the pose similarity is greater than or equal to the predetermined threshold, at block 520, it is determined that the candidate person has the pose similar to the reference person. If the pose similarity is smaller than the predetermined threshold, it is determined that the candidate person have no pose similar to the reference person. In addition, if there are other candidate persons in the candidate image, returning back to block 510, it continues to calculate the pose similarity for other candidate persons.

Referring back to FIG. 4, if it is determined that at least one candidate person has the pose similar to the reference person, at block 430, the corresponding candidate image is determined as the target image. If it is determined that no candidate person in the candidate image has the pose similar to the reference person, then returning back to block 410 and 420, it is determined whether the one or more candidate persons in other candidate images have the pose similar to the reference person, and thus the target image can be determined.

In the embodiments of the present disclosure, the number of the target images may also be predetermined. In an embodiment, the target images may be arranged in a descending order of the pose similarity. If the target image includes a plurality of candidate persons that have the pose similar to the reference person, the greatest pose similarity may be used for the target images in the arrangement. Then, the predetermined number of target images with the high pose similarity may be determined as the final target images.

Further, after the target image is determined, the determined target image may be provided. For example, the target image may be presented on the display.

Figure 7:
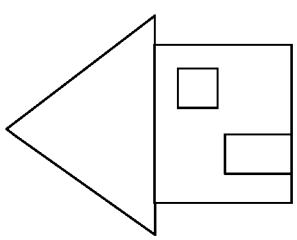
FIG. 7 shows a schematic diagram illustrating the replacing of the candidate person in the target image with the reference person according to an embodiment of the present disclosure.
Figure 7:
Figure 7:
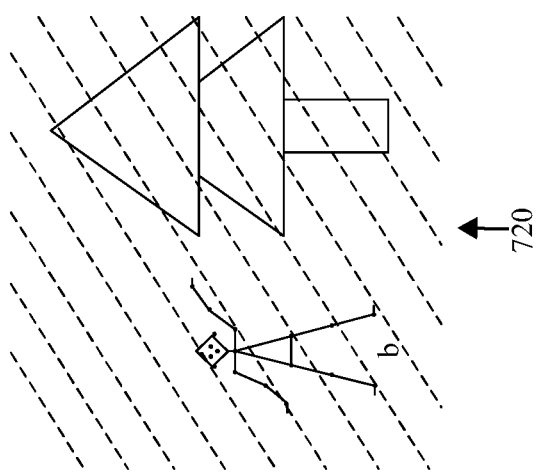
Figure 7:
Figure 7:
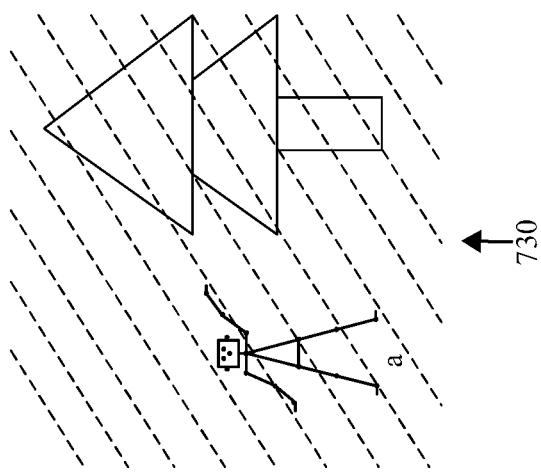
Figure 7:

Alternatively or additionally, in other embodiments of the present disclosure, after the target image is determined, the candidate person in the target image having the pose similar to the reference person may be replaced with the reference person to generate a new image and the new image is presented. FIG. 7 shows a schematic diagram illustrating the replacing of the candidate person in the target image with the reference person according to an embodiment of the present disclosure. The reference person "a" in the photograph 710 has the pose similar to the candidate person "b" in the painting 720. As shown in FIG. 7, the reference person "a" is separated from the photograph 710 by a semantic segmentation method, and then the candidate person b in the painting 720 is replaced with the reference person "a" by a style transfer method, so as to generate a new painting 730. Although FIG. 7 shows only an example in which the pose of the reference person "a" is similar to the whole body pose of the candidate person "b" and the candidate person "b" is completely replaced with the reference person "a", it will be appreciated that the pose of the reference person "a" may be similar to the partial body pose of the candidate person "b" and the partial body of the candidate person "b" that has the pose similar to the reference person "a" may be replaced with the reference person "a".

Figure 8:
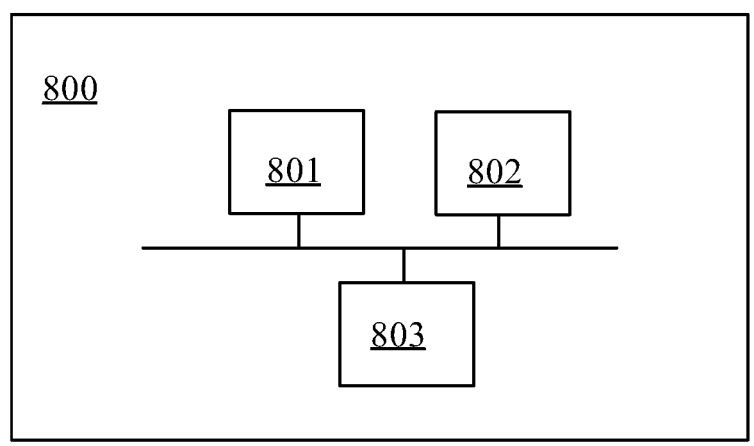
FIG. 8 shows a schematic block diagram of an apparatus for searching for an image according to an embodiment of the present disclosure.

FIG. 8 is a schematic block diagram of an apparatus 800 for searching for an image according to an embodiment of the present disclosure. In this embodiment, the apparatus 800 can implement the method for searching for the image described above with reference to FIGS. 1 to 7.

As shown in FIG. 8, the apparatus 800 may include a processor 801 and a memory 802. The memory 802 is coupled to the processor 801 and has computer instructions stored therein. When the processor 801 executes the stored computer program instructions, the apparatus 800 may be configured to perform the method as described above with reference to FIGS. 1 to 7 to search for the image. In addition, the apparatus 800 may further include an input/output device 803, which is coupled to the processor 801 and the memory 802 via a bus.

In the embodiments of the present disclosure, the processor 801 may be, for example, a central processing unit CPU, a microprocessor, a digital signal processor (DSP), a processor based on a multi-core processor architecture, or the like. The memory 802 may be any type of memory implemented using data storage technology, including but not limited to random access memory, read-only memory, semiconductor-based memory, flash memory, magnetic disk memory, or the like. The input/output device 803 may be, for example, a microphone, a keyboard, a mouse, a display, a speaker, or the like.

Several embodiments of the present disclosure have been described specifically above, but the protection scope of the present disclosure is not limited thereto. In fact, the novel embodiments described herein can be implemented in various other forms. In addition, various omissions, substitutions, and modifications in the form of the embodiments described herein may be made without departing from the spirit of the present disclosure. The appended claims and their equivalents are intended to cover such forms or modifications that fall within the scope and spirit of the present disclosure.

What is claimed is:

1. A computer-implemented method for searching for an image, the method comprising:
    training a second pose recognition model based on a second sample image set;
    transferring a part or all of the images in the second sample image set from a photograph type to a painting type to obtain a first sample image set;
    training a first pose recognition model based on the first sample image set;
    obtaining, by at least one processor, reference keypoint data of a reference person in a reference image using the second pose recognition model;
    obtaining, by the at least one processor and for each candidate image of a set of candidate images, candidate keypoint data of one or more candidate persons in the candidate image using the first pose recognition model;
    calculating, by the at least one processor and for each of the one or more candidate persons, a pose similarity between the candidate person and the reference person based on the reference keypoint data and the candidate keypoint data;
    determining, by the at least one processor and in response to the pose similarity being greater than a predetermined threshold, that the candidate person has a pose similar to the reference person;
    determining, by the at least one processor and in response to at least one candidate person having the pose similar to the reference person, the corresponding candidate image as a target image;
    replacing the at least one candidate person in the target image with the reference person to generate a new image; and
    providing the new image.

2. The method according to claim 1, wherein calculating the pose similarity between the candidate person and the reference person comprises:
    calculating a pose distance L between the candidate person and the reference person according to the following equations:

$$d_k = \sqrt{(x_k - x_{0k})^2 + (y_k - y_{0k})^2}$$

$$l_k = \frac{1}{1 + e^{\left(5 + \frac{h}{2} - \frac{d_k}{h}\right)}} + \frac{1}{2}$$

$$L = \sum_{k=0}^{K-1} l_k$$

wherein K represents a number of keypoints of the candidate person, wherein $x_k$ and $y_k$ represent coordinates of keypoint k of the candidate person in the candidate image, wherein $0 \leq k \leq K-1$, $x_{0k}$ and $y_{0k}$ represent coordinates of keypoint k of the reference person in the reference image, wherein h represents a head length of the reference person, wherein $d_k$ represents a distance between keypoint k of the candidate person and keypoint k of the reference person, and wherein $l_k$ represents a sub-pose distance between keypoint k of the candidate person and keypoint k of the reference person; and
    calculating the pose similarity based on the pose distance, wherein the shorter the pose distance is, the greater the pose similarity is.

3. The method according to claim 1, wherein the reference keypoint data and the candidate keypoint data are obtained based on a same human coordinate system.

4. The method according to claim 3, wherein the human coordinate system is a torso triangle coordinate system, wherein an origin of the torso triangle coordinate system is a midpoint of a connecting line between a keypoint indicating a right waist and a keypoint indicating a left waist, wherein a horizontal axis is in a direction of the connecting line between the keypoint indicating the right waist and the keypoint indicating the left waist, and wherein a vertical axis passes through a midpoint of a connecting line between a keypoint indicating a left shoulder and a keypoint indicating a right shoulder and is perpendicular to the horizontal axis.

5. An apparatus for searching for an image, the apparatus comprising:
    one or more processors; and
    a memory coupled to the one or more processors, and having computer program instructions stored therein, wherein the computer program instructions are configured to, when executed by the processor, cause the apparatus to perform a method comprising:
        training a second pose recognition model based on a second sample image set;
        transferring a part or all of the images in the second sample image set from a photograph type to a painting type to obtain a first sample image set;
        training a first pose recognition model based on the first sample image set;
        obtaining reference keypoint data of a reference person in a reference image using the second pose recognition model;
        obtaining, for each candidate image of a set of candidate images, candidate keypoint data of one or more candidate persons in the candidate image using the first pose recognition model;
        calculating, for each of the one or more candidate persons, a pose similarity between the candidate person and the reference person based on the reference keypoint data and the candidate keypoint data;
        determining, in response to the pose similarity being greater than a predetermined threshold, that the candidate person has a pose similar to the reference person;

determining, in response to at least one candidate person having the pose similar to the reference person, the corresponding candidate image as a target image;

replacing the at least one candidate person in the target image with the reference person to generate a new image; and providing the new image.

6. The apparatus according to claim 5, wherein calculating the pose similarity between the candidate person and the reference person comprises:

calculating a pose distance L between the candidate person and the reference person according to the following equations:

$$d_k = \sqrt{(x_k - x_{0k})^2 + (y_k - y_{0k})^2}$$

$$l_k = \frac{1}{1 + e^{\left(5 + \frac{h}{2} - \frac{d_k}{h}\right)}} + \frac{1}{2}$$

$$L = \sum_{k=0}^{K-1} l_k$$

wherein K represents a number of keypoints of the candidate person, wherein $x_k$ and $y_k$ represent coordinates of keypoint k of the candidate person in the candidate image, wherein $0 \leq k \leq K-1$, $x_{0k}$ and $y_{0k}$ represent coordinates of keypoint k of the reference person in the reference image, wherein h represents a head length of the reference person, wherein $d_k$ represents a distance between keypoint k of the candidate person and keypoint k of the reference person, and wherein $l_k$ represents a sub-pose distance between keypoint k of the candidate person and keypoint k of the reference person; and calculating the pose similarity based on the pose distance, wherein the shorter the pose distance is, the greater the pose similarity is.

7. The apparatus according to claim 5, wherein the reference keypoint data and the candidate keypoint data are obtained based on a same human coordinate system.

8. The apparatus according to claim 7, wherein the human coordinate system is a torso triangle coordinate system, wherein an origin of the torso triangle coordinate system is a midpoint of a connecting line between a keypoint indicating a right waist and a keypoint indicating a left waist, wherein a horizontal axis is in a direction of the connecting line between the keypoint indicating the right waist and the keypoint indicating the left waist, and wherein a vertical axis passes through a midpoint of a connecting line between a keypoint indicating a left shoulder and a keypoint indicating a right shoulder and is perpendicular to the horizontal axis.

9. A non-transitory computer-readable storage medium having computer program instructions stored thereon, wherein the computer program instructions are configured to, when executed by a computer, cause the computer to perform a method comprising:

training a second pose recognition model based on a second sample image set;

transferring a part or all of the images in the second sample image set from a photograph type to a painting type to obtain a first sample image set;

training a first pose recognition model based on the first sample image set;

obtaining, by at least one processor, reference keypoint data of a reference person in a reference image using the second pose recognition model;

obtaining, by the at least one processor and for each candidate image of a set of candidate images, candidate keypoint data of one or more candidate persons in the candidate image using the first pose recognition model;

calculating, by the at least one processor and for each of the one or more candidate persons, a pose similarity between the candidate person and the reference person based on the reference keypoint data and the candidate keypoint data;

determining, by the at least one processor in response to the pose similarity being greater than a predetermined threshold, that the candidate person has a pose similar to the reference person;

determining, by the at least one processor and in response to at least one candidate person having the pose similar to the reference person, the corresponding candidate image as a target image;

replacing the at least one candidate person in the target image with the reference person to generate a new image; and providing the new image.

\* \* \* \* \*